Figure 1:
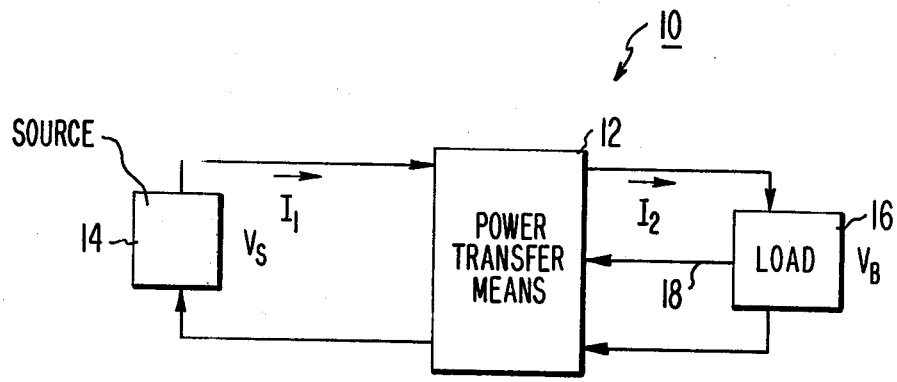

United States Patent [19]
Larrabee

[11] 4,204,147
[45] May 20, 1980

[54] POWER TRANSFER APPARATUS

[75] Inventor: Robert D. Larrabee, Princeton, N.J.

[73] Assignee: RCA Corporation, New York, N.Y.

[21] Appl. No.: 821,786

[22] Filed: Aug. 4, 1977

[51] Int. Cl.$^2$ .............................. H02J 7/00; H02J 7/10
[52] U.S. Cl. .......................................... 323/4; 318/327;
320/39; 323/15; 323/20; 323/43.5 S; 363/17
[58] Field of Search .............. 323/4, 6, 15, 20, 43.5 R,
323/43.5 S; 307/126

[56] References Cited

U.S. PATENT DOCUMENTS

| | | | |
|---|---|---|---|
| 3,277,320 | 10/1966 | Conner | 323/43.5 R |
| 3,293,531 | 12/1966 | Dortort | 323/43.5 R |
| 3,373,345 | 3/1968 | Hung | 323/43.5 R |
| 3,626,198 | 12/1971 | Boehringer | 323/20 |
| 3,952,240 | 4/1976 | Ruumpol | 323/6 X |
| 3,970,918 | 7/1976 | Cooper | 323/6 |

OTHER PUBLICATIONS

C. A. Berard, Jr., A Second Generation (High–Speed) Maximum Power Tracker for Space Applications, presented to Fifth Space Congress, Cocoa Beach, Fla., Mar. 13, 1968.
R. Gruber, "High Efficiency Solar Cell Array Peak Power Tracker & Battery Charger", PCSC '70 Record, pp. 128–138.
Advanced voltage Regulator Techniques as Applied to Maximum Power Point Tracking Systems for the Nimbus Meteorological Satellite, Final Report for NASA, Washington, D.C., AED R-3221, Oct. 10, 1967.

*Primary Examiner*—A. D. Pellinen
*Attorney, Agent, or Firm*—Samuel Cohen; William Squire

[57] ABSTRACT

A power transfer apparatus includes an impedance matching system coupled between a variable voltage source, e.g., a solar cell array, and a load. A parameter of the load indicative of the power being delivered to the load is sensed and the control signal thereby derived is employed to adjust the impedance matching system. The adjustment is such as to maximize the value of the parameter.

3 Claims, 9 Drawing Figures

POWER TRANSFER APPARATUS

Of interest is the following copending application Ser. No. 821,801, now U.S. Pat. No. 4,131,827, entitled POWER TRANSFER APPARATUS, filed concurrently by the present inventor and assigned to the same assignee as the present invention.

The present invention relates to power transfer apparatus for transferring power from a variable power source to a load.

Prior art power transfer devices are usually concerned with achieving a control function with a device in a circuit. For example, in a spacecraft application where solar cell arrays are utilized to power loads such as batteries aboard spacecraft excess power is provided by the source, and is used to achieve load voltage control at some predetermined lower voltage level. The excess power is wasted. Other power transfer arrangements attempt to achieve control of some load parameter such as motor speed at some fixed predetermined level, regardless of available power.

In terrestial applications for solar cells, it is important to reduce capital costs in order to make such cells economically feasible power sources. "Wasted" power implies that more solar cells are employed than are actually needed in an array of such cells and this increases the cost of a system employing an energy source of this kind. To achieve optimum cost effectiveness as many as possible of the available units of power obtainable from the solar cells should be utilized.

Solar cells are not inherently matched to any load. The impedance that the cells must work into is a function of the incident sunlight then available which may vary from zero at night to a maximum during bright sunny days. Further, the diurnal cycle of sunlight is not normally coincident with the diurnal cycle of most load demands. Most solar cells deliver a direct current where many loads require alternating current or at least a pulsating DC current. Because of these factors, an interfacing circuit is normally employed between the solar cells and their load to effect the desired power transfer between the two.

Adjustable power transfer means are provided for coupling power from a source of electrical power whose value may vary to a load. Sensing means are coupled to the load for sensing a load parameter indicative of the power delivered by the power transfer means to the load and for producing a control signal in response thereto indicative of the level of the power. Means responsive to the control signal for adjusting the power transfer means to alter the value of at least one of the current and voltage delivered by the power transfer means to the load in a sense to maximize the load parameter over a range of values of power produced by said source.

Figure 5:
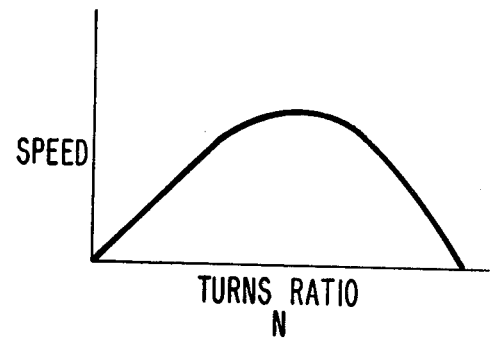
Figure 6:
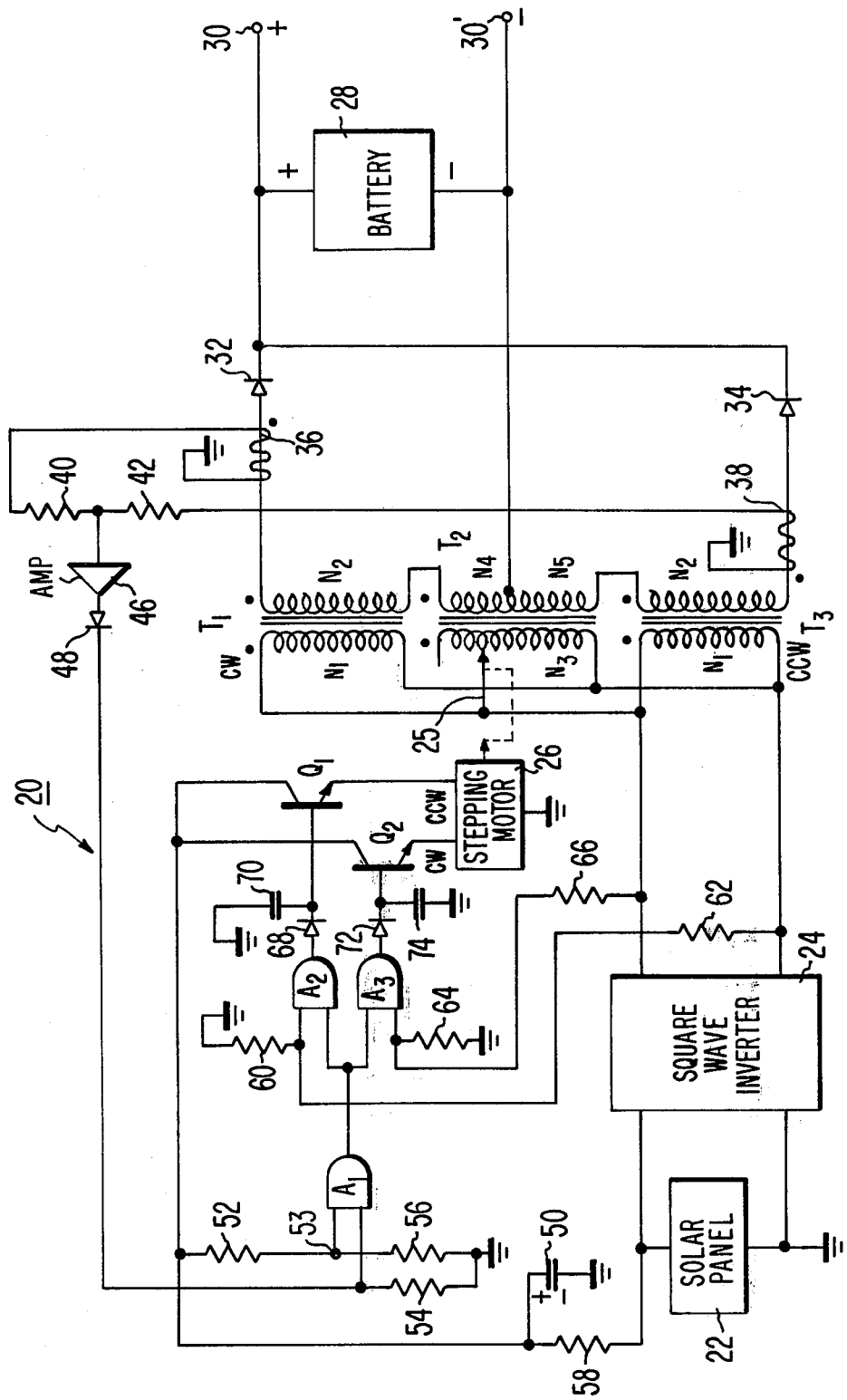
Figure 7:
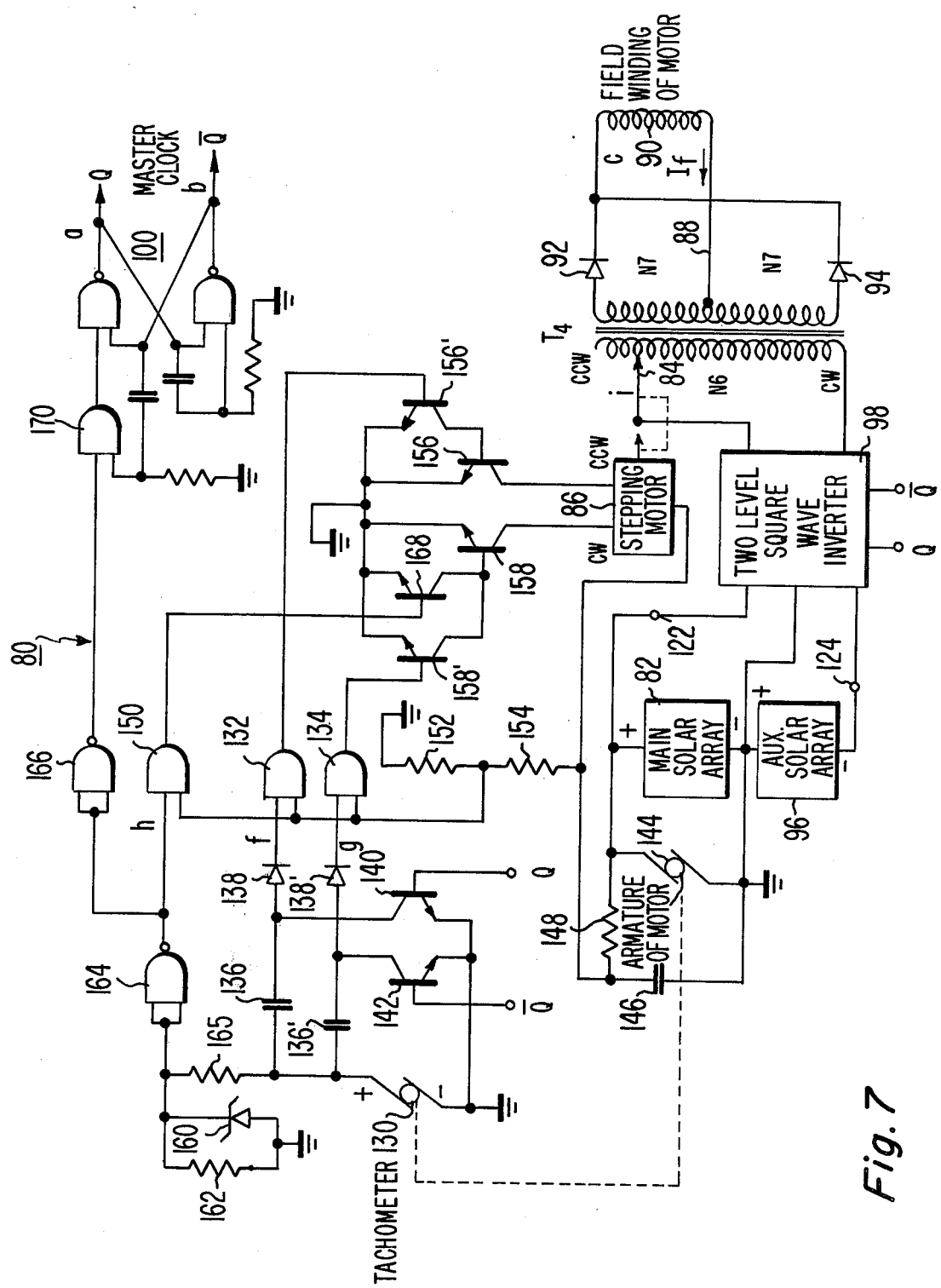
Figure 8:
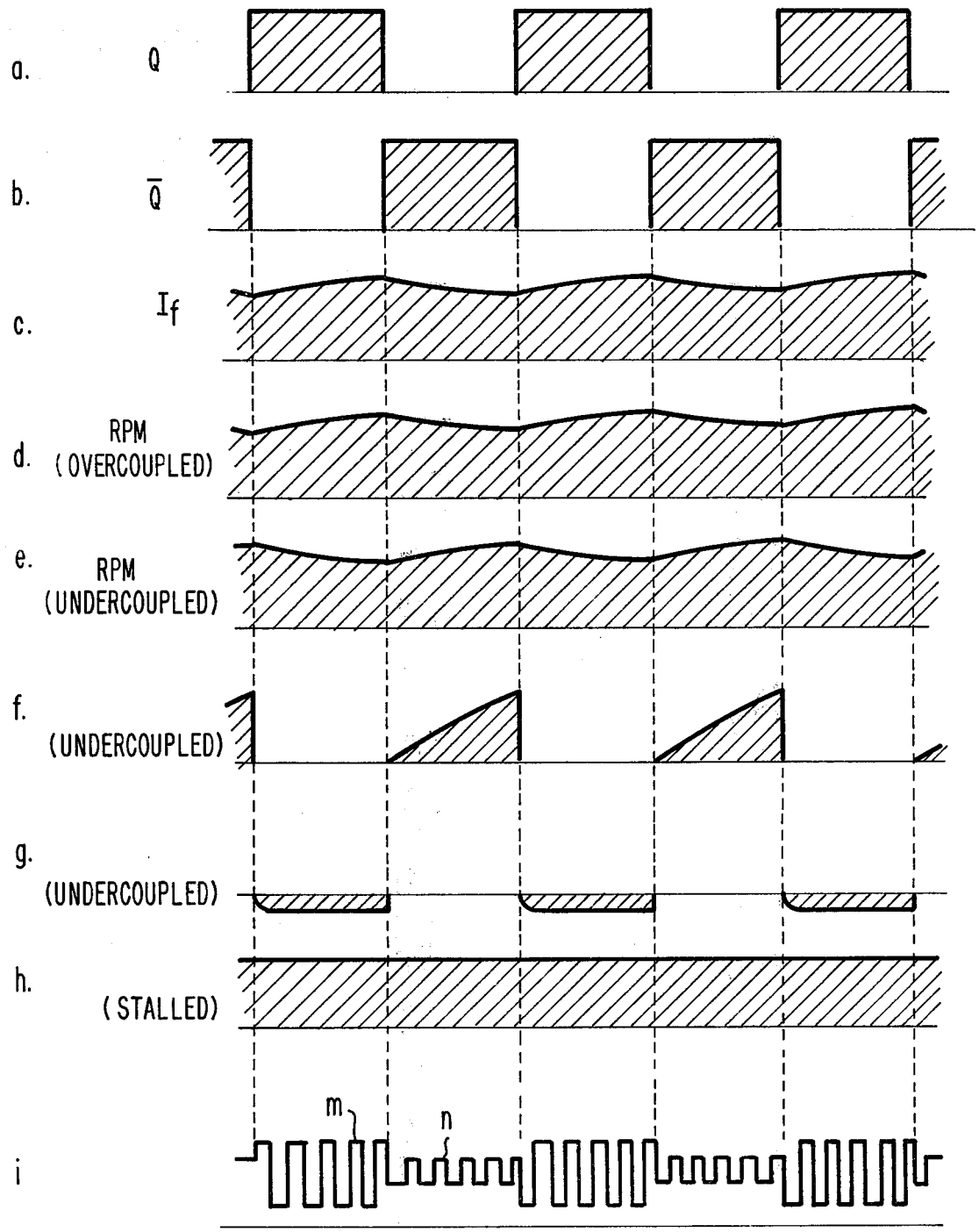
Figure 9:
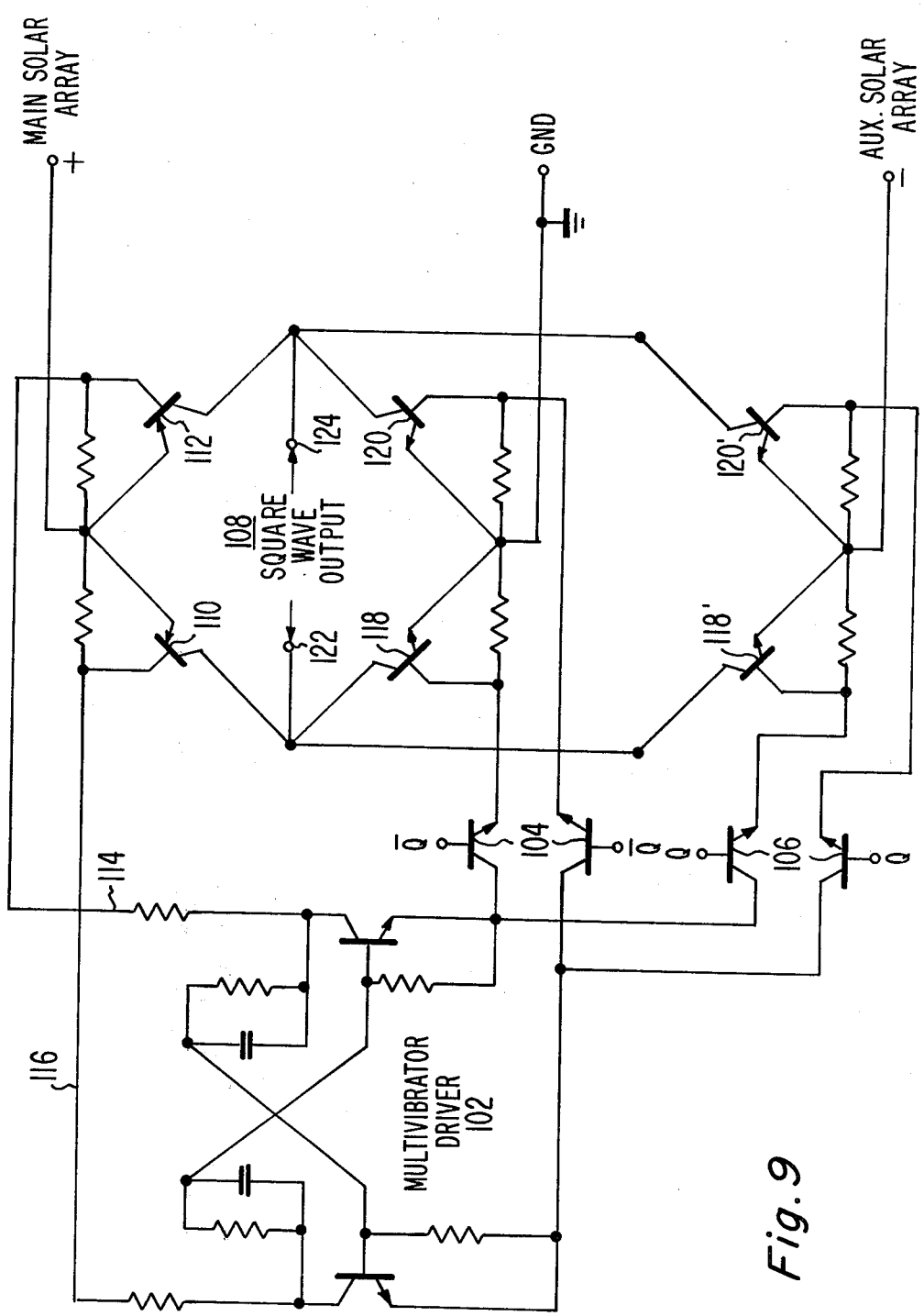

In the Drawing:

FIG. 1 is a block diagram schematically illustrating the principles of the invention, FIGS. 2-5 are graphs useful in explaining the present invention, FIG. 6 is a circuit diagram of one embodiment of the invention, FIG. 7 is a circuit diagram of a second embodiment of the invention, FIG. 8 is a graph of curves useful in explaining the operation of the embodiment of FIG. 7, and FIG. 9 is a circuit diagram of the inverter of FIG. 7.

In FIG. 1, power transfer apparatus 10 includes a power transfer means 12 which includes an adjustable impedance transformation means such as an impedance matching transformer or its equivalent coupled between a source of power 14 and a load 16. The source produces an output voltage $V_s$ which may be DC and which may vary in amplitude. The source, for example, may be an array of solar cells, or any other power source and it may produce an AC or DC voltage. The source 14 has an internal impedance whose value is dependent on the amplitude of the voltage it is producing. The source 14 is connected to the power transfer means 12 to provide a first circuit. The output of the power transfer means 12 is applied to the load 16. The load may be of any type and, by way of example, may be a battery, or a motor or any combination of these and other devices. A particular implementation in which the load is a battery is shown in FIG. 6 and one in which the load is a DC motor is described in connection with FIGS. 7-9.

A value of a parameter characterizing the load is sensed and applied to the power transfer means 12 via lead 18. The parameter is a function of the power applied to the load. If load 16, for example, is a battery, the parameter sensed can be the charging current $I_2$. If load 16 is a motor, the current $I_2$ may be the field winding current, and the parameter sensed may be the speed, or the torque, or any other parameter of the motor which it is desired to optimize. A signal representing the value of the sensed parameter is applied via lead 18 to the adjustable impedance means within the power transfer means 12 for altering the impedance in a sense to match the impedance of the source 14 to that of the load 16.

Figure 2:
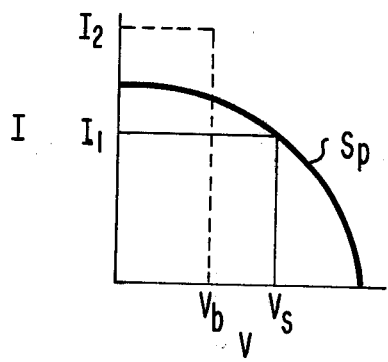

Power transfer means 12 by approximately matching the impedance between the source 14 and load 16 provides optimum utilization of the power then available at the source by the load. In FIG. 2 curve $S_p$ shows the current-voltage relationship of the power available at the source 14 when the source 14 is for example, a solar cell array. For a given illumination incident on the array and a given voltage $V_s$ generated in response thereto, there is a given current $I_1$ produced by the array. The power provided by the source 14 is the product $V_s I_1$. Where the load 16 is a battery having a given voltage $V_b$, then the input current $I_2$ which should be supplied to the battery to make the power supplied to the battery equal to that available from the load is $I_2 = V_s I_1 / V_b$. As the I-V product for the source 14 (the solar cell array) changes with the illumination incident of the array, the charging current $I_2$ supplied by the array also must change.

Figure 3:
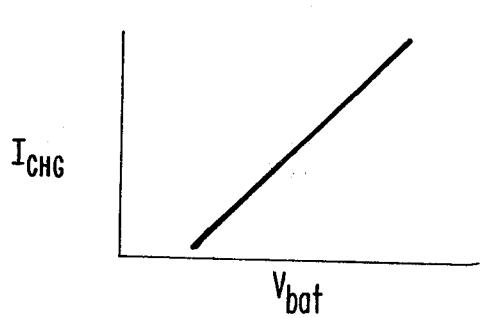
Figure 4:
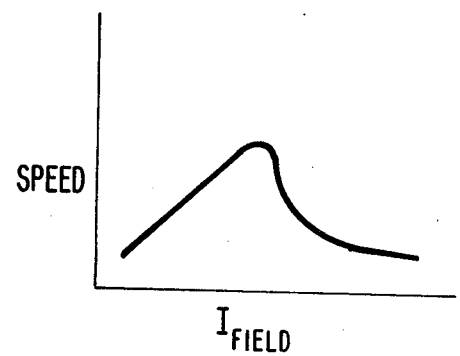

FIG. 3 shows the relationship between the charging current $I_{ch}$ and the battery voltage $V_{bat}$ of a storage battery. Since in the present system the purpose of the solar cell array is to charge the battery, it is desirable to provide the maximum charging current possible. There will be a maximum charging current determined by the power available from the solar cell array under any given state of illumination. In the present example it is the purpose of the power transfer to charge the battery at this maximum rate.

Where the load 16 is a DC motor, the current $I_2$ can represent the field winding current. The field current will vary the speed of the motor as shown in FIG. 4. There is an optimum field current at which the motor speed is maximum. The sense means in this case generates a speed signal having a value indicative of this speed, and applies the sense signal to lead 18 of FIG. 1.

Transfer means 12 responds to this signal to provide current $I_2$ corresponding to the maximum motor speed.

Where the power transfer means includes an adjustable impedance matching transformer as described later, it is seen in FIG. 5, that the sensed parameter (i.e. speed or charging current) will have a value that corresponds to the turns ratio in the transformer. There is an optimum turns ratio corresponding to the maximum motor speed. In this example optimum impedance matching (power transfer) is achieved by adjusting this turns ratio to obtain maximum motor speed. Power transfer means 12 optimizes the power applied to the load for a specified parameter of the load. Thus, maximum utilization of the power then available at the source 14 is made at all times.

In FIG. 6, system 20 includes a solar panel 22 formed of an array of conventional solar cells connected to the primary windings $N_1$, $N_3$, $N_1$ of transformers $T_1$, $T_2$ and $T_3$, respectively, through a squarewave inverter 24. The inverter 24 converts the DC voltage from panel 22 into an AC signal suitable for application to the transformers $T_1$, $T_2$ and $T_3$. The windings $N_1$, $N_3$, and $N_1$ are connected in parallel to the output of the inverter 24. One connection to primary winding $N_3$ is via a variable tap 25 whose position is controlled by stepping motor 26. The secondary windings have the same number of turns as the primary windings to which they are coupled. Windings $N_4$ and $N_5$ couple to the settable primary winding $N_3$. Secondary windings $N_2$ and $N_4$ of transformers $T_1$ and $T_2$ are serially connected across the battery 28 and to output terminals 30 and 30' through diode 32 and current sensing transformer 36. Secondary windings $N_2$ and $N_5$ of transformers $T_3$ and $T_2$ are serially connected across the battery 28 and output terminals 30 and 30' through diode 34 and current sensing transformer 38.

The winding of current transformer 36 is connected at one terminal to ground and at its other terminal to a terminal of the winding of transformer 38 through resistance 40 and 42 which are of equal value. The other terminal of the winding of transformer 38 is connected to ground. Secondary windings $N_4$ and $N_5$ have unequal numbers of turns so that the voltage produced by windings $N_2$ of transformer $T_1$ and $N_4$ is different than the voltage produced by windings $N_2$ of transformer $T_3$ and $N_5$. As a result, the battery charging current may have one value when diode 32 conducts and another value when diode 34 conducts. Any such difference is sensed by current transformers 38 and 36 and a corresponding AC voltage is generated at the connection between resistors 40 and 42.

Amplifier 46 has its input connected to the lead between resistances 40 and 42 for providing an amplified output signal of this difference in magnitude between the two AC signals produced by current sensing transformers 36 and 38. The AC signal output of amplifier 46 is rectified by diode 48 and applied to one input of AND gate $A_1$. This rectified signal will be positive during that phase of the inverter 24 cycle corresponding to the larger of the currents through the secondary diodes 34 or 32. If this difference is large enough, the input of AND gate $A_1$ will be activated during this half-cycle of inverter 24. Diode 48 prevents applying a large negative voltage to the input of AND gate $A_1$ during the subsequent half-cycle.

AND gate $A_1$ has its other input connected to tap 53 of voltage divider 52, 56. The solar panel 22 charges capacitance 50 through current limiting resistance 58. The voltage divider 52, 56 divide this voltage to the value required by the AND gate. Capacitor 50 charges up through resistance 58 from the power available from the solar panel 22. When the voltage generated by the solar panel is sufficiently high, AND gate $A_1$ is enabled and the circuit becomes operational.

The output of gate $A_1$ is one input to AND gates $A_2$ and $A_3$. The other input of AND gate $A_2$ is connected to ground through resistance 60 and to one output of squarewave inverter 24 through resistance 62. The other input of AND gate $A_3$ is connected to ground through resistance 64 and to the other output of inverter 24 through resistance 66. Resistances 64 and 66 form a voltage divider to bring the voltage at gate $A_3$ to a suitable low level for logic circuitry, for example, 5 volts. Resistances 60 and 62 form a similar divider with respect to gate $A_2$.

AND gate $A_1$ is enabled in response to the concurrent receipt of a pulse from diode 48 and a logic one level from tap 53. When gate $A_1$ is enabled, inverter 24 enables one of gates $A_2$ or $A_3$ depending upon which output of the inverter is high (logic one). Thus, only one of gates $A_2$ or $A_3$ can be enabled for a given set of conditions. The output of gate $A_2$ biases the base electrode of transistor $Q_1$ through diode 68. The base electrode of transistor $Q_1$ is connected to ground through capacitance 70. The output of gate $A_3$ is applied to the base electrode of transistor $Q_2$ through diode 72, this base electrode being connected to ground through capacitance 74. The emitters of transistors $Q_1$ and $Q_2$ are respectively connected to the counter-clockwise (CCW) and clockwise (CW) inputs of stepping motor 26 while the collector electrodes are tied together and connected to the common connection between capacitance 50 and resistance 58. Capacitance 50 has a capacity sufficient to drive stepping motor 26 when one of the transistor switches $Q_1$ or $Q_2$ is placed in the conductive state. That state occurs upon the enabling of the corresponding AND gate $A_2$ or $A_3$ in accordance with the phase relationship between the amplifier 46 output signal and inverter 24 output signal.

In operation, assuming the solar panel 22 is receiving incident sunlight, capacitor 50 charges up to a voltage corresponding to the voltage then at the solar panel. Resistance 58 and capacitor 50 have an RC time constant of several seconds to permit the capacitance 50 to charge up. This time constant is significantly greater then the time period of the inverter 24.

In the meantime, the inverter 24 provides a squarewave output to transformers $T_1$, $T_2$ and $T_3$. Due to the difference in the number of turns of transformer $T_1$ plus turns $N_4$ forming one secondary winding path and the number of turns $N_5$ plus turns $N_2$ of transformer $T_3$ forming a second secondary winding path, a different voltage occurs for each path, and thus, different currents flow through diodes 32 and 34 in alternate half cycles. The difference in amplitude of the currents is detected by the amplifier 46 via the circuit formed by current transformers 36 and 38 and equal resistances 40 and 42, amplified, rectified by diode 48, and applied to AND gate $A_1$. Any difference in current sensed by transformer 36 and 38 and appearing on the connection between resistances 40 and 42 indicates that there is impedance imbalanace between the battery 28 circuit and the solar panel 22 circuit. That is, the charge current should be changed for the conditions then existing at the solar panel 22.

The number of secondary turns $N_2$ plus $N_4$ in circuit with current sensing transformer 36 is smaller then the number of turns $N_5$ plus $N_2$ in circuit with current sensing transformer 38. Assume this results in a greater current flowing through diode 34 than through diode 32. This results in the generation of a positive signal at amplifier 46 when the square wave inverter 24 generates a positive signal at the input of AND gate $A_2$. The charge in capacitance 50 and the output of the amplifier 46 enables gate $A_1$ which in turn enables gate $A_2$ turning on transistor $Q_1$ which discharges capacitor 50 through the counter-clockwise winding of stepping motor 26. This drives the variable tap 25 in a direction to decrease the number of primary turns on transformer $T_2$. This increases the output voltage and increases the charging current to the battery. Should the current remain in imbalance in the same direction, the variable tap 25 will reduce the number of primary turns of $T_2$ still further. This process continues until the currents alternately passing through diodes 32 and 34 for the conditions then existing at the solar panel 22 are equal. Further attempt to increase the current by reducing the number of primary turns on $T_2$ will over-couple the system and result in excessive IR drop within the solar panel and less voltage (power) available to charge the battery.

Should the conditions at the solar panel be such that the current through diode 32 is greater then the current through diode 34 (e.g., change in sunlight) then gate $A_3$ will be enabled, biasing on transistor $Q_2$ and driving the stepping motor in a clockwise direction. Tap 25 then increases the number of turns on $N_3$ which in turn increases the battery current. This action is continued until again the currents in diode 32 and 34 equalize to a point the voltage at the output of amplifier 46 drops below the threshold of AND gate $A_1$. At this point AND gate $A_1$ is disabled, the action stops, and capacitor 50 remains charged. The circuit remains in this condition until once again the currents passing through diodes 32 and 34 become unequal.

The battery 28 can also drive a load connected to the terminals 30 and 30' so that the solar panel 22 can drive the load connected to those terminals or, if the load does not draw sufficient current, charge the battery 28 while simultaneously driving such a load. While a number of transformers are illustrated in FIG. 6 for providing the impedance matching operation it is evident that a single transformer with a single variable primary winding can also be utilized such as illustrated in connection with the embodiment of FIG. 7.

In FIG. 7, power transfer system 80 drives a DC motor at maximum speed for a given condition at a power source, solar array 82. An impedance matching transformer $T_4$ has its primary winding $N_6$ adjusted by a controllable variable tap 84 which is driven by stepping motor 86 either in a clockwise or counter-clockwise direction. Transformer $T_4$ has first and second secondary windings $N_7$ having equal number of turns and having a common center tap 88 connected to one end of field winding 90 of a DC motor. The other ends of the secondary windings $N_7$ are connected to the other end of the field winding through respective recitifying diodes 92 and 94 for converting the AC signal at the transformer $T_4$ to a DC signal. A second lower power auxiliary solar array 96 is applied as an input to two level squarewave inverter 98. The main solar array 82 is also connected to the two level squarewave inverter 98 with the negative and positive terminals of the arrays 82 and 96, respectively, having a common input.

The output signal of the inverter 98 is shown by curve i FIG. 8. Curve i shows a waveform which is a modulated squarewave having two amplitudes. Inverter 98 has two signals Q and $\overline{Q}$ applied as an input thereto from master clock 100.

The master clock 100 is a multivibrator for generating squarewave curves a and b, FIG. 8. The Q output, curve a, of the master clock is high in one-half of each cycle while the $\overline{Q}$, output curve b, is high in the other half of each cycle. The inverter is shown in more detail in FIG. 9.

The inverter 98 comprises a conventional high frequency squarewave multivibrator driver 102 which generates signals at a higher frequency than that of the master clock frequency. The output of the multivibrator driver 102 is directed by a first pair of transistor switches 104 and a second pair of transistor switches 106. The control electrodes of switches 104 and 106 are respectively connected to the $\overline{Q}$ and Q outputs of the master clock 100. The squarewave generator 108 includes two PNP transistors 110 and 112 having their emitters connected to the main solar array positive terminal. Their bases are connected to the respective outputs 114 and 116 of the multivibrator driver 102. The collectors of transistors 110 and 112 are respectively connected to output terminals 122 and 124 and to ground through the collector-emitter paths of NPN transistors 118 and 120, respectively. The base electrode of transistor 118 is connected to one output of driver 102 through one of the transistor switches 104 while the base electrode of transistor 120 is connected through the other of switches 104 to the other output of driver 102. The driver 102 comprises a pair of RC networks cross-coupled as shown. In parallel across transistors 118 and 120 are a second pair of transistors 118'- 120'. The base electrodes of 118' and 120' are connected through respective switches 106 to the corresponding outputs of driver 102 as are the respective base electrodes of transistors 118 and 120 through switches 104. The junction of the emitters of transistors 118' and 120' is connected to the negative terminal of the low power auxiliary solar array 96. The squarewave output signal, curve i, appearing at terminals 122 and 124, is applied to the primary winding of transformer $T_4$.

The $\overline{Q}$ output of master clock 100, curve b, is applied to the base electrodes of transistors 104, while the Q output of the master clock 100 curve a is applied to the base electrodes of transistors 106. The Q and $\overline{Q}$ outputs of master clock 100 are squarewaved 180° out of phase as shown in FIG. 8.

Returning to FIG. 7, speed detecting tachometer 130, is connected at its positive terminal to one input of AND gate 132 through capacitance 136 and diode 138 and to one input to AND gate 134 through capacitance 136' and diode 138'. Switching transistors 140 and 142 have their base electrodes respectively connected to the Q and $\overline{Q}$ outputs of the master clock 100 for respectively coupling the junction of capacitance 136 and diode 138 to ground when Q is high and the junction of capacitance 136' and diode 138' to ground when $\overline{Q}$ is high. The armature 144 of the DC motor is connected directly to the main solar array 82 across which is serially connected capacitance 146 and resistance 148. Capacitance 146 is charged by the main solar array 82. Resistance 148 and capacitance 146 have a time constant which is of the order of several seconds.

One input of each of AND gates 132, 134 and 150 is connected to the junction of voltage dividing resistance 152 and 154. The other end of resistance 152 is connected to ground and the other end of resistance 154 is connected to capacitance 146. When a sufficient charge is present in capcitance 146, AND gates 132 and 134 are primed. If at the same time the other input of either AND gate 132 or 134 is high that gate becomes enabled. Only one such gate can be enabled at one time. When gate 132 is enabled its output turns on transistors 156, 156' which couples the counter-clockwise (CCW) windings of stepping motor 86 to ground, driving the wiper 84 in the CCW direction. This direction increases the number of turns on the primary winding, $N_6$. When AND gate 134 is enabled, this turns on transistors 158, 158' which connects the clockwise windings of stepping motor 86 to ground, driving motor 86 and the wiper 84 in the clockwise direction, decreasing the number of turns on the primary winding $N_6$. Power for driving the stepping motor 86 is derived from the discharge of capacitor 146 through the stepping motor 86 through the corresponding turned-on Darlington pair to ground. The voltage dividing effect of resistors 152 and 154 is such that only when the voltage at capacitor 146 is sufficiently high will the gates 132, 134 or 150 be enabled.

Zener diode 160 and resistor 162 are connected in parallel between ground and the input of NAND gate 164 to clamp the input of gate 164 to a suitable low level voltage when the motor is running. The NAND gate 164 input is also connected to the positive terminal of tachometer 130 through resistance 165. The output of NAND gate 164 is applied as an input to AND gate 150 and also as an input to NAND gate 166. The output of NAND gate 164 is shown by curve h, FIG. 8 when the armature 144 exhibits a stalled condition. Transistor 168 forms with transistor 158 a second Darlington pair which turns on when both inputs to AND gate 150 are high. This occurs when the motor is in a stalled condition and the tachometer 130 output is zero volts.

In operation, the speed of the motor armature 144 is continually monitored by the tachometer 130. The tachometer provides a DC output voltage directly proportional to the motor RPM. The circuitry determines if and in what direction the tap 84 of transformer $T_4$ should be changed to maximize the motor RPM. If the circuitry demands a change, one of the transistors 158 or 156 turns on, discharging capacitance 146 through the appropriate winding of the stepping motor which mechanically varies the tap 84 position. Once capacitance 146 is discharged, the logic circuit is inactivated at gates 132, 134 and 150 until the capacitance 146 has recharged through resistance 148. Therefore, the circuitry displaces the transformer tap 84 to the desired position in a series of steps at a speed proportional to the time constant presented by capacitance 146 and resistance 148. The circuit senses the optimum at that point in which the motor speed variation with field current is zero or, more realistically, when the speed variation is small enough to produce below threshold signals to the logic circuitry. When in the optimum state, the logic circuitry draws only the stand-by power that is necessary to operate itself. Capacitance 146 at that time charges up to a full voltage of the main solar array 182 and then draws no further current.

If the motor is initially stalled as might occur at the beginning of the day due to insufficient developed torque to start rotation, the tachometer output will be zero, the output of NAND gate 164 will be a Logic one and, if the charge of capacitor 146 is sufficiently high to enable AND gate 150, this high signal will be passed on to the Darlington pair 158, 168 and capacitance 146 will be discharged through the CW winding of the stepping motor 86. This will step down the tap on the transformer $T_4$ increase the secondary to primary turns ratio and thus increase the rectified output voltage delivered to the motor field winding. The resulting increase of motor field current produces a higher magnetic field within the motor which, with the given amount of armature current, will produce a greater torque and rotation may thus be initiated. If insufficient torque is developed, the above sequence of events will be repeated once capacitance 146 is recharged through resistance 148 and ultimately the motor will start or the tap will reach its limiting CW position. This position could be determined by the maximum permissible field current in the motor. In this latter event, the starting of the motor must await more incident light from the solar array 82 that will enable a larger armature current to flow and thus produce a larger required starting torque. In the stalled phase, the output of AND gate 166 is a logic low, thus disabling AND gate 170. This disables clock 100 placing it in the Q high state. This places the greater voltage, curve i, on the inverter output aiding the motor starting cycle. Once the motor starts and gains sufficient speed so that the tachometer 130 output voltage actuates NAND gate 164, AND gate 170 is activated and the master clock begins to operate. At the same time, AND gate 150 is inactivated so that the mode of operation shifts to that appropriate for a running motor condition.

Assume the armature 144 of the motor is drawing less than optimum current from the main solar array 82. This is defined herein as undercoupled condition. The corrective measure in this case is less field current (magnetic field within the motor) so that the internally generated armature counter-voltage will be less for any given speed and thus, the armature current will be greater. The percentage increase in armature current will be larger than the percentage reduction in the field current (magnetic field), so that the output torque will increase, thus speeding up the motor to a new equilibrium condition at a higher speed and a higher armature current.

Thus, in the circuit's testing of the effects of varying field current, the motor speed will trace out curve e, FIG. 8. Capacitor 136, FIG. 7, is connected across the tachometer 130 output by transistor 140 during the Q-high phase of the master clock. When the clock output changes and Q goes low, transistor 140 is biased off and the residual voltage across the capacitance 136 is placed in series with the tachometer output voltage as far as the AND gate 132 is concerned. The charge left on capacitance 136 corresponds to the minimum speed attained at the end of the Q-high clock phase. Therefore, during the following Q-low clock phase (when the motor speed is increasing), the voltage at the input of gate 132 will be an increasing funcof time as shown in FIG. 8f. That is, the voltage on the capacitance 136 will be increasing as the voltage from the tachometer 130 is added thereto during the Q-low cycle. When the speed variation is sufficiently large, the voltage will build up to a level sufficiently high to activate gate 132 and bias on the transistors 156 and 156' and discharge capacitance 146 through the CCW winding of stepping motor 86 increasing the tap position of tap 86. This decreases the transformer turns ratio which decreases the voltage across the field winding 90 and which causes a corresponding decrease in the field current $I_f$. The input to AND gate 134, FIG. 8g, is zero or negative under these undercoupled conditions (because the charge left on capacitance 136' is that corresponding to the maximum during the clocking cycle), and thus gate 134 is never activated. Transformer tap 84 is stepped towards the desired setting until the motor reaches its maximum speed for the particular level of voltage then being generated by the solar array 82. In other words the variations in motor speed, near its maximum speed, becomes sufficiently small that AND gate 132 is no longer activated during the Q-low clock cycle. At this point all action stops (the tap 84 remains in the position to which it has been driven) until there is a change in the cell illumination level or a change in the loading of the motor.

Should the armature of the motor draw more than optimum current from the main solar array 82 (herein defined as the overcoupled case) the output voltage from the solar array 82 is undesirably low (because of internal IR drops) and the power delivered to the armature circuit is below optimum. This is the converse of the undercoupled case discussed above and this requires an increase in field current for its correction. This is accomplished in the circuit of FIG. 7 by the components comprising transistor 142, capacitance 136' AND gate 134 and the transistors 158 and 158' in the converse manner to that discussed above for the undercoupled case. Thus, the circuit of FIG. 7 can handle any situation of either too high or too low a field current for existing conditions and shift the transformer tap position that maximizes the motor RPM for the prevailing ambient sunlight conditions.

In FIG. 8i, the two level inverter output has two voltage amplitudes m/n which continually cause the motor to have two separate field winding currents in alternate clock cycles. This contantly causes a shifting in speed of the motor. As seen in FIG. 5, there is one maximum speed for a given turns ratio and solar cell illumination. The constantly shifting speed of the motor due to the variation of field winding currents causes the circuit to hunt for the maximum speed for a given illumination. As seen in FIG. 4, a plot of speed verses the field current, there is but one maximum field current for a maximum speed. By constantly causing the circuit to shift the field current, the circuit of FIG. 7 automatically hunts and seeks that point representing the maximum speed of the armature for a given amount of solar cell power available. Thus, the circuit of FIG. 7 optimizes the speed not to any predetermined speed as in prior motor control systems but maximizes the speed for the given available power that is available from the array 82 at any instant. It also permits providing maximum torque to the motor for initial start up conditions when the motor has previously been allowed to stop due to insufficient available power.

In FIG. 7, a tachometer is illustrated as a speed sensor. However, the circuit is adaptable to other sensors instead. For example, in an application in which storage of mechanical energy is desired, the torque output of the armature 144 can be maximized instead of speed. In this case the motor can be so mounted that its output torque can be sensed and transduced to a DC voltage and applied to the circuit of FIG. 7. In this way the circuit will automatically cause the motor to deliver the maximum torque to the flywheel. In that particular application, there is no need for stalled mode of operation since the motor torque will never be zero as long as the solar panel is illuminated, and the corresponding components can thus be deleted from the circuit of FIG. 7.

What is claimed is:

1. The combination of:
a source of electrical power whose value may vary;
a load;
adjustable power transfer means for coupling the power from said source to said load;
sensing means coupled to said load for sensing a load parameter indicative of the power delivered by said power transfer means to said load and for producing a control signal in response thereto indicative of the level of said power;
said sensing means including means for providing first and second current paths between said power transfer means and said load, through which paths current may flow in a given direction to said load, and means for comparing the relative values of the currents in said first and second paths for producing said control signal manifesting said relative values; and
means responsive to said control signal for adjusting the power transfer means to alter the value of at least the current delivered by said power transfer means to said load in a sense to maximize said load parameter over a range of values of power produced by said source.

2. The combination of claim 1 wherein said means for adjusting the power transfer means includes means for adjusting the relative values of said currents in said paths in a sense to tend to make them equal.

3. The combination of:
a source of electrical power whose value may vary;
a load;
adjustable power transfer means for coupling the power from said source to said load;
sensing means coupled to said load for sensing a load parameter indicative of the power delivered by said power transfer means to said load and for producing a control signal in response thereto indicative of the level of said power;
said sensing means including transformer means having input and output winding means, means for connecting a first portion of the output winding means in a first current path through said load and a second portion of the output winding means in a second current path through said load, the current values in said paths being approximately the same when said load parameter is maximized, means for connecting the input winding means to said source, means responsive to the value of the current in said current paths coupled to said input winding means, and means for adjusting the turns ratio of said transformer means in a direction tending to equalize the values of said currents; and
means responsive to said control signal for adjusting the power transfer means to alter the value of at least the current delivered by said power transfer means to said load in a sense to maximize said load parameter over a range of values of power produced by said source.

* * * * *